Figure 1:
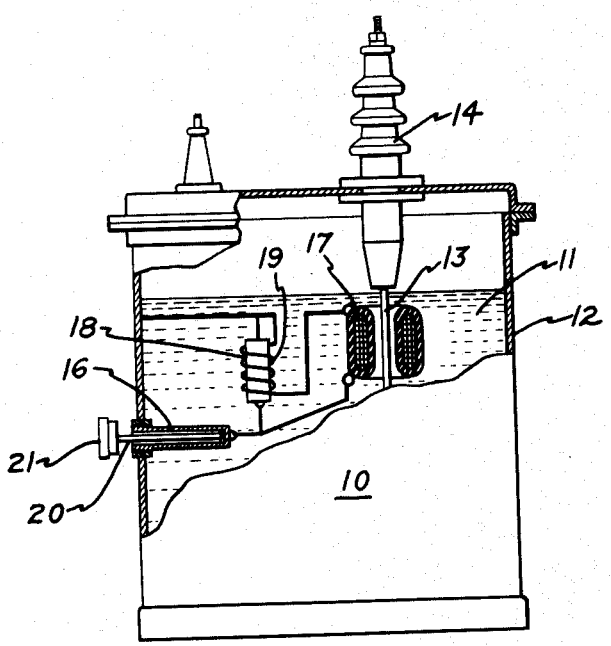

Sept. 26, 1961 K. W. EISSMANN 3,002,128
OVERLOAD PROTECTIVE MEANS FOR ELECTRICAL APPARATUS
Filed Aug. 29, 1957

Inventor,
Kurt W. Eissmann,
by Gilbert P. Tarleton
His Attorney.

United States Patent Office 3,002,128
Patented Sept. 26, 1961

3,002,128
OVERLOAD PROTECTIVE MEANS FOR
ELECTRICAL APPARATUS
Kurt W. Eissmann, Dalton, Mass., assignor to General Electric Company, a corporation of New York
Filed Aug. 29, 1957, Ser. No. 680,935
5 Claims. (Cl. 317—14)

This invention relates to electrical apparatus, and more in particular to improved protective arrangement for indicating overloads or operating protective relay devices for such apparatus. While the following specification is directed mainly to the application of my protective arrangement to transformers, it will be obvious that the invention may also be employed on other types of electrical apparatus.

The operating temperature of a transformer winding is determined by the load it carries, its thermal characteristics, and the temperature of its cooling medium. Heretofore, the temperature of transformer windings have been simulated by immersing a heating coil in the cooling medium of the transformer, and passing a current through the coil that is proportional to a current of the transformer. Relay means actuated by a thermally responsive device positioned in heat transfer relationship with the heating coil were then provided in order to give an alarm of the occurrence of excessive temperature in the transformer, or the relay means initiated the operation of cooling fans or operated circuit breakers to remove the transformer from operation in the event of excessive winding temperature.

The insulation materials used in constructing transformer windings are designed to withstand the normal operating temperatures of the transformer. Excessive heating of the insulation will cause deterioration, and result in sacrifice in useful insulation life, the reduction in life being dependent upon magnitude and duration of the excessive temperature. In some instances, however, in order to obtain maximum service from the transformer, it is desirable to operate the transformer at overloads, the permissible overload time being a function of the magnitude of overload. It is, therefore, desirable that overload protective means be responsive to the permissible overload of the transformer as a function of time.

In the previously described type of protective means, which comprises a heater simulating winding temperature in close heat transfer relationship with a thermal responsive device, the protective means is usually responsive only to a predetermined fixed temperature, and hence the device would operate protective relays or indicate overload conditions for all overloads regardless of their magnitude or direction.

Various arrangements have been employed in the past in order to convert the previously described fixed temperature device into a device that would be responsive to permissible overloads of a transformer. For example, in one arrangement, a fixed resistor is connected in shunt with the heater in order that the temperature rise in the heater is lower than the temperature rise in the winding. In the other arrangement, heavy thermal insulation is placed between the heater and the thermally responsive device in order that the temperature detected by the thermally responsive device lags the actual apparatus temperature. While each of these means may be calibrated to respond to permissible overload for one specific magnitude of overload, it has been found that the characteristics of a compensation could not be adjusted to accurately respond to the permissible overload over a wide range of overload magnitudes.

It is therefore an object of this invention to provide an improved overload protective device for electrical apparatus.

It is also an object of this invention to provide an overload protective device for electrical apparatus that provides more accurate response to overload over a wide range of overload magnitudes than the previously described shunt resistance and thermal lag devices.

Briefly stated, in accordance with one aspect of my invention, I provide thermal overload protective means for electrical apparatus of the type immersed in a dielectric fluid. The relay means comprises a resistance heating means immersed in the fluid, and means such as a current transformer connected to the apparatus for providing a current proportional to a current of the apparatus. The current transformer is connected so that the proportional current flows through the heating means. Means such as a resistor having a negative temperature coefficient of resistance is also immersed in the fluid and is connected to shunt a portion of the proportional current around the resistance heating means so that the current through the resistance heater has a ratio with respect to a current of the apparatus that decreases with increases in the apparatus current. A temperature sensitive means is disposed in the fluid in heat transfer relation with the heating means. The current transformer may also be connected so that the proportional current flows through another resistance heating means disposed in heat transfer relation with the negative temperature coefficient of resistance.

While the specification concludes with claims particularly pointing out and distinctly claiming the subject matter which I regard as my invention, it is believed that the invention will be better understood from the following description taken in connection with the accompanying drawing.

Figure 2:
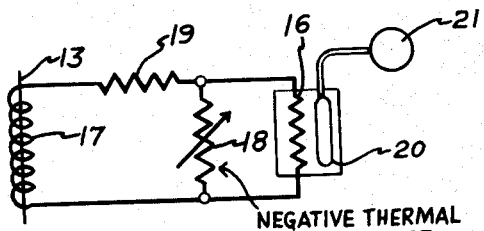
Figure 4:
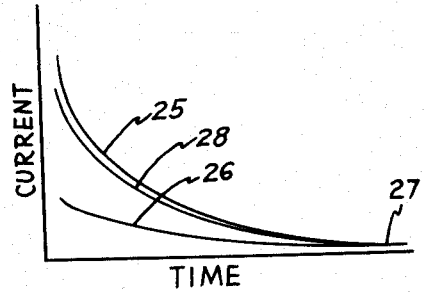
Figure 3:
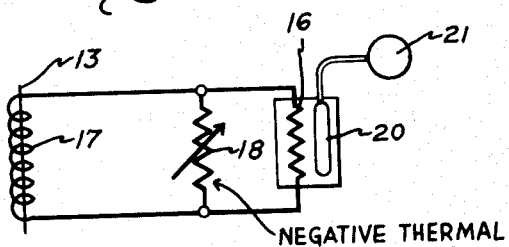

In the drawing:
FIG. 1 is a partially cross-sectional view of a transformer illustrating one embodiment of the thermal overload protective arrangement of my invention, FIG. 2 is a circuit diagram of the thermal overload protective arrangement of the transformer of FIG. 1, FIG. 3 is a circuit diagram of a modified form of thermal overload protective arrangement according to my invention, and FIG. 4 is a graph comparing permissible overload characteristics of a transformer with the characteristics of prior devices and the characteristics of the thermal overload protective arrangement of my invention.

Referring now to the drawing and more in particular to FIG. 1, therein is illustrated an electrical apparatus 10 comprising an electrical device immersed in a dielectric fluid 11 within an enclosure 12. The specific electrical device which may, for example, be a transformer, has not been illustrated for the sake of clarity. A conductor 13 connected to the electrical device extends through an insulating bushing 14 to provide external connection for the electrical device.

A resistance heating element, which may for example be in the form of a tubular member 16 of stainless steel, is immersed in the dielectric fluid 11. One end of the tube 16 is sealed, and the other end extends through the wall of the enclosure 12 to form a well accessible from the exterior of the apparatus. A current transformer in which the conductor 13 comprises the primary winding, has a secondary winding 17 connected in series with the resistance tube 16. As illustrated in the drawing, the enclosure wall may form a part of this connection if desired.

A resistor 18 having a substantial negative temperature coefficient of resistance is connected in parallel with the resistance tube 16, and another resistance heater 19, connected in series with the secondary winding of the current transformer and the resistance tube 16, is disposed in heat transfer relation with the negative temperature coefficient of resistor 18. It will be obvious, of course, that other shapes of resistance elements and resistance heaters may be employed without departing from the spirit or scope of my invention.

A thermal sensitive element 20, such as a bulb containing a thermally expansible fluid, is disposed in heat transfer relation with the resistance heater 16, for example, by being positioned within the well defined by the tube 16. Suitable protective means, such as an indicator or relay device 21, is connected to the tube 20 to respond to overload conditions of the apparatus.

In the modification of my invention illustrated in FIG. 3, the additional resistance heater for heating the negative thermal coefficient of resistance resistor 18 has been omitted, the resistance 18 being self-heating.

Referring now to the graph of FIG. 4, curve 25 illustrates the typical permissible overload currents as a function of time of electrical apparatus such as transformers. In order to obtain maximum service from the electrical apparatus, it is therefore desirable that the thermal overload protective device respond to permissible overload as defined by the curve 25. The overload response provided by the previously described shunt resistance and thermal lag type of overload protective devices is indicated by the curve 26. Thus, while this type of device may be calibrated to accurately respond to permissible overload at a particular point, such as indicated by the numeral 27, it has been found that the overload response at currents of greater magnitude is substantially less than the permissible overload. By providing a resistor having a negative thermal coefficient of resistance in parallel with the resistance heater, the present invention provides a thermal overload protective device having a response curve 28 which substantially coincides with the permissible overload characteristic 25. While the positions of the curves of FIG. 4 may vary with ambient temperature, the relative positions of the curves with respect to each other are substantial independent of ambient temperature.

Since the resistance of resistor 18 decreases with increases in temperature, increased secondary current from the current transformer 17 resulting from increased load on the transformer or electrical apparatus effects a decrease in the resistance 18, as a result of increased current flowing through the resistance heater 19. Because of the decrease in resistance of resistor 18, a smaller proportion of the total secondary winding current of the current transformer will flow through the resistance heater 16, and consequently the temperature rise over fluid temperature detected by the overload device will be less than the actual temperature rise of the apparatus. Since the proportion of current transformer current flowing through the resistance heater 16 varies as an inverse function of the magnitude of the current, the attaining of sufficient temperature in the resistance heater 16 to detect an apparatus overload substantially coincides with the occurrence of actual apparatus overload as defined by the permissive load characteristic.

While it is preferred from a standpoint of stable operation that the resistance heater 19 be provided so that the resistance of resistor 18 is a determinable function of apparatus load, if desired this heater may be omitted, as shown in FIG. 3, and a self-heating negative temperature coefficient of resistance resistor be employed for the resistor 18.

It will be understood, of course, that while the forms of the invention herein shown and described constitute preferred embodiments of my invention, it is not intended herein to illustrate all the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. Thermal overload protective means for electrical apparatus of the type immersed in a dielectric fluid comprising, first and second serially connected resistance heating means, said first heating means comprising a tubular resistance element, thermally responsive means in said tubular element, current transformer means having a secondary winding connected in series with said second heating means, a lead of said apparatus comprising the primary winding of said transformer, and resistance means having a negative temperature coefficient of resistance immersed in said fluid in heat transfer relation with said second resistance heating means and connected in parallel with said first resistance heating means.

2. Electrical apparatus of the type subject to temporary excessive temperature rises due to temporary current overloads, said apparatus being immersed in heat transfer relationship with a dielectric fluid contained in an enclosure, and thermal overload protective means responsive to currents exceeding a predetermined permissible current overload as a function of time, said protective means comprising, resistance heating means immersed in said fluid, thermal responsive means in heat transfer relationship with said resistance heating means, means responsive to current of said apparatus electrically connected to said resistance heating means and providing a current proportional to current in said apparatus, shunt means having a resistance inversely proportional to temperature associated with said current responsive means in such a manner that the resistance of said shunt means decreases with current increases in said apparatus, said shunt means being immersed in said fluid and electrically connected to bypass a predetermined portion of said proportional current around said resistance heating means so that the rise in apparatus temperature due to current surges above fluid temperature rise detected by said protective means is less than the actual temperature rise of said apparatus.

3. Electrical apparatus of the type subject to temporary excessive temperature rises due to temporary current overloads, said apparatus being immersed in heat transfer relationship with a dielectric fluid contained in an enclosure, and thermal overload protective means responsive to currents exceeding a predetermined permissible current overload as a function of time, said protective means comprising, a tubular resistance element passing through an opening in said enclosure and immersed in said fluid, thermal responsive means in heat transfer relationship with said resistance heating means, means responsive to current of said apparatus electrically connected to said resistance heating means and providing a current proportional to current in said apparatus, resistance means having a negative temperature coefficient associated with said current responsive means in such a manner that the resistance of said resistance means decreases with current increases in said apparatus, said resistance means being immersed in said fluid and electrically connected to bypass a predetermined portion of said proportional current around said tubular resistance element so that the rise in apparatus temperature due to current surges above fluid temperature rise detected by said protective means is less than the actual temperature rise of said apparatus.

4. Electrical apparatus of the type subject to temporary excessive temperature rises due to temporary current overloads, said apparatus being immersed in heat transfer relationship with a dielectric fluid contained in an enclosure, and thermal overload protective means responsive to currents exceeding a predetermined permissible current overload as a function of time, said protective means comprising a tubular resistance element passing through an opening in said enclosure and immersed in said fluid, thermal responsive means within said tubular resistance element in heat transfer relationship therewith, resistance means immersed in said fluid and electrically connected in parallel with said tubular resistance element, transformer means employing a lead from said apparatus as its primary winding and having its secondary winding electrically connected in series with said resistance means and said tubular resistance element so as to provide a current proportional to current of said apparatus, said resistance means having a negative temperature coefficient so that its resistance decreases with current increases in said apparatus, thus causing a predetermined portion of said proportional current to bypass said tubular resistance element, whereby the rise in apparatus temperature due to current surges above fluid temperature rise detected by said protective means is less than the actual temperature rise of said apparatus.

5. Electrical apparatus of the type subject to temporary excessive temperature rises due to temporary current overloads, said apparatus being immersed in heat transfer relationship with a dielectric fluid contained in an enclosure, and thermal overload protective means responsive to currents exceeding a predetermined permissible current overload as a function of time, said protective means comprising a tubular resistance element having a closed end passing through an opening in said enclosure and immersed in said fluid, thermal responsive means within said tubular resistance element in heat transfer relationship therewith, first resistance means immersed in said fluid and electrically connected in parallel with said tubular resistance element, second resistance means in heat transfer relationship with said first resistance means, a current transformer employing a lead from said apparatus as its primary winding and having its secondary winding electrically connected in series with said first and second resistance means and said tubular resistance element so as to provide a current proportional to current of said apparatus, said first resistance means having a negative temperature coefficient so that its resistance decreases with current increases in said apparatus, thus causing a predetermined portion of said proportional current to shunt said tubular resistance element, whereby the rise in apparatus temperature due to current surges above fluid temperature rise detected by said protective means is less than the actual temperature rise of said apparatus.

References Cited in the file of this patent

UNITED STATES PATENTS

| | | |
|---|---|---|
| 1,989,610 | Stephens | Jan. 1, 1935 |
| 2,123,063 | Peters | July 5, 1938 |
| 2,334,530 | Andrews | Nov. 16, 1943 |
| 2,403,372 | Jackson | July 2, 1946 |
| 2,438,495 | Chatterjea | Mar. 30, 1948 |
| 2,491,798 | Camilli et al. | Dec. 20, 1949 |
| 2,834,920 | Lennox et al. | May 13, 1958 |

FOREIGN PATENTS

| | | |
|---|---|---|
| 557,707 | Great Britain | Dec. 1, 1943 |
| 565,134 | Great Britain | Oct. 27, 1944 |
| 728,862 | Great Britain | Apr. 27, 1955 |